(12) United States Patent
Nishizawa et al.

(10) Patent No.: US 9,539,546 B2
(45) Date of Patent: Jan. 10, 2017

(54) EXHAUST GAS PROCESSING DEVICE, DIESEL ENGINE, AND EXHAUST GAS PROCESSING METHOD

(71) Applicant: Komatsu Ltd., Tokyo (JP)

(72) Inventors: Izumi Nishizawa, Oyama (JP); Tadashi Iijima, Yuuki (JP); Takumi Sugihara, Oyama (JP)

(73) Assignee: Komatsu Ltd., Tokyo (JP)

( * ) Notice: Subject to any disclaimer, the term of this patent is extended or adjusted under 35 U.S.C. 154(b) by 20 days.

(21) Appl. No.: 14/427,445

(22) PCT Filed: Jul. 24, 2013

(86) PCT No.: PCT/JP2013/070089
§ 371 (c)(1),
(2) Date: Mar. 11, 2015

(87) PCT Pub. No.: WO2014/041899
PCT Pub. Date: Mar. 20, 2014

(65) Prior Publication Data
US 2015/0224447 A1  Aug. 13, 2015

(30) Foreign Application Priority Data
Sep. 13, 2012 (JP) ................................. 2012-201881

(51) Int. Cl.
*B01D 53/94* (2006.01)
*F01N 3/18* (2006.01)
(Continued)

(52) U.S. Cl.
CPC ....... *B01D 53/9495* (2013.01); *B01D 53/9431* (2013.01); *F01N 3/021* (2013.01);
(Continued)

(58) Field of Classification Search
CPC ...... B01D 53/9418; F01N 3/021; F01N 3/033; F01N 3/18; F01N 3/20; F01N 3/206; F01N 3/208; F01N 2900/1406; F01N 2900/1411
See application file for complete search history.

(56) References Cited

U.S. PATENT DOCUMENTS 8,470,274 B2  6/2013 Maus et al.
9,273,580 B2  3/2016 Huthwohl
(Continued)

FOREIGN PATENT DOCUMENTS

CN  102317588 A  1/2012
CN  102365435 A  2/2012
(Continued)

OTHER PUBLICATIONS

International Search Report dated Oct. 22, 2013, issued for PCT/JP2013/070089.

*Primary Examiner* — Timothy Vanoy
(74) *Attorney, Agent, or Firm* — Locke Lord LLP (57) ABSTRACT

An exhaust gas processing device includes a NOx detection sensor, a first catalyst provided to a first branch pipe, a second catalyst provided to a second branch pipe, a first pressure sensor and a second pressure sensor which are arranged on the upstream side of the first catalyst and the second catalyst and which detect pressures in the first branch pipe and the second branch pipe, and a control device that obtains flow rates of exhaust gas flowing through the first branch pipe and the second branch pipe based on detection values of the first pressure sensor and the second pressure sensor and obtains amounts of reducing agent to be given to the first catalyst and the second catalyst from the obtained flow rates and a concentration of NOx of the exhaust gas.

11 Claims, 3 Drawing Sheets

(51) Int. Cl.
*F01N 3/20* (2006.01)
*F01N 3/021* (2006.01)
*F01N 13/00* (2010.01)

(52) U.S. Cl.
CPC ........... *F01N 3/208* (2013.01); *F01N 13/009* (2014.06); *F01N 13/011* (2014.06); *F01N 2410/00* (2013.01); *F01N 2560/026* (2013.01); *F01N 2560/08* (2013.01); *F01N 2610/02* (2013.01); *F01N 2900/08* (2013.01); *F01N 2900/1402* (2013.01); *F01N 2900/1404* (2013.01); *F01N 2900/1406* (2013.01); *F01N 2900/1411* (2013.01); *Y02T 10/24* (2013.01)

(56) References Cited

U.S. PATENT DOCUMENTS

| | | |
|---|---|---|
| 9,375,682 B2 | 6/2016 | Maus et al. |
| 2004/0118108 A1 | 6/2004 | Ripper et al. |
| 2011/0022335 A1 | 1/2011 | Foucault et al. |
| 2012/0036835 A1 | 2/2012 | Huthwohl |
| 2012/0039779 A1 | 2/2012 | Maus et al. |
| 2012/0210697 A1* | 8/2012 | Garimella ............... F01N 3/208 60/274 |
| 2012/0210700 A1* | 8/2012 | Sisken .................. F01N 3/2066 60/277 |
| 2013/0064717 A1 | 3/2013 | Masaki et al. |
| 2013/0259751 A1 | 10/2013 | Maus et al. |

FOREIGN PATENT DOCUMENTS

| | | | |
|---|---|---|---|
| DE | 102014004439 A1 * | 10/2015 | ........... F01N 3/2066 |
| EP | 1857650 A1 | 11/2007 | |
| EP | 1857650 B1 | 4/2010 | |
| JP | 2005-256632 | 9/2005 | |
| JP | 2005-256632 A | 9/2005 | |
| JP | 2006-233893 A | 9/2006 | |
| JP | 3905264 B2 | 4/2007 | |
| JP | 4131667 B2 | 8/2008 | |
| JP | 4148231 B2 | 9/2008 | |
| JP | 4351091 B2 | 10/2009 | |
| JP | 2011-089479 A | 5/2011 | |
| JP | 2011-515689 A | 5/2011 | |
| WO | WO-2011/118525 A1 | 9/2011 | |
| WO | WO 2014/203406 A1 * | 12/2014 | ............ F01N 3/208 |

* cited by examiner

FIG.4

EXHAUST GAS PROCESSING DEVICE, DIESEL ENGINE, AND EXHAUST GAS PROCESSING METHOD

FIELD

The present invention relates to an exhaust gas processing device that includes a plurality of NOx reducing catalysts that purify exhaust gas by a reducing agent, a diesel engine, and an exhaust gas processing method.

BACKGROUND

Regarding a diesel engine, to reduce an amount of NOx (nitrogen oxide) contained in exhaust gas, for example, Patent Literature 1 describes a technique that processes exhaust gas from a diesel engine by two NOx occlusion reduction type catalysts.

CITATION LIST

Patent Literature

Patent Literature 1: Japanese Patent Application Laid-open No. 2006-233893

SUMMARY

Technical Problem

As a technique that processes exhaust gas of a diesel engine, there is a technique called urea SCR (Selective Catalytic Reduction), which reduces NOx contained in the exhaust gas by using a selective catalyst and a reducing agent. When a displacement of a diesel engine is small, the exhaust gas can be purified by one selective catalyst. However, when a displacement of a diesel engine is large, the capacity of one NOx reducing catalyst is insufficient to process the exhaust gas. Therefore, a passage of the exhaust gas is branched to a plurality of passages and the exhaust gas is purified by a selective catalyst arranged in each passage. In such processing, if the amount of reducing agent supplied to the plurality of selective catalysts is inappropriate, the purification of NOx may be insufficient or ammonia not used for reaction may be exhausted.

The technique described in Patent Literature 1 obtains a flow rate of exhaust gas flowing through each exhaust system by using a particulate filter with an oxidation catalyst, a particulate filter carrying a NOx occlusion reduction type catalyst, and an exhaust gas pressure on the downstream side of an exhaust gas purifier such as a NOx occlusion reduction type catalyst and a selective reducing type NOx catalyst. In this technique, regarding an exhaust gas pressure on the upstream side of each filter (corresponding to the exhaust gas purifier), a measurement position of the exhaust gas pressure is limited to the downstream side of each filter (paragraph 0095 in the specification) because the calculation accuracy of actual exhaust gas flow rate (actual intake air amount) may degrade due to relative differences between PM collection amounts of each filter and the like. However, the exhaust gas pressure (pressure of the exhaust gas) and the variation of the exhaust gas pressure are small on the downstream side of the exhaust gas purifier, so that it is difficult to ensure accuracy when measuring the exhaust gas pressure. Therefore, it is also difficult to ensure accuracy of the flow rate of exhaust gas flowing through each exhaust gas system, which is obtained by using the exhaust gas pressure on the downstream side of the exhaust gas purifier. As a result, it is difficult for the technique described in Patent Literature 1 to supply an appropriate amount of reducing agent to a plurality of catalysts.

An object of the present invention is to, when processing exhaust gas exhausted from a diesel engine by using a plurality of catalysts that reduces NOx to reduce NOx, to accurately supply an appropriate amount of reducing agent to each catalyst.

Solution to Problem

According to the present invention, an exhaust gas processing device comprises: a plurality of exhaust gas passages, wherein exhaust gas exhausted from a diesel engine is divided to pass through the exhaust gas passages; a reducing catalyst which is provided in each of the exhaust gas passages and reduces NOx in the exhaust gas by a reducing agent; a NOx detection sensor which is arranged on an upstream side of the catalyst in an exhaust gas flowing direction and which detects a concentration of NOx contained in the exhaust gas exhausted from the diesel engine; a pressure sensor which is arranged on an upstream side of each of the reducing catalysts in the exhaust gas flowing direction and which detects a pressure in each of the exhaust gas passages; and a control device that obtains a flow rate of the exhaust gas flowing through each of the exhaust gas passages based on at least a detection value of each of the pressure sensors, obtains a flow rate of NOx in each of the exhaust gas passages from the obtained flow rate of the exhaust gas in each of the exhaust gas passages and the concentration of NOx detected by the NOx detection sensor, and obtains an amount of reducing agent to be given to each of the reducing catalysts from the obtained flow rate of NOx in each of the exhaust gas passages.

In the present invention, it is preferable that the exhaust gas processing device further comprises: an exhaust gas total flow rate detection unit that obtains a total flow rate of the exhaust gas exhausted from the diesel engine, wherein the control device obtains a flow rate ratio of the exhaust gas flowing through the exhaust gas passages based on the detection value of each of the pressure sensors, and obtains the flow rate of the exhaust gas flowing through each of the exhaust gas passages based on the obtained flow rate ratio and the total flow rate of the exhaust gas.

In the present invention, it is preferable that the control device obtains the total flow rate of the exhaust gas from an intake air amount of the diesel engine and a fuel injection amount to the diesel engine.

In the present invention, it is preferable that the exhaust gas processing device further comprises: a temperature sensor that detects a temperature of the exhaust gas flowing through each of the exhaust gas passages, wherein the control device obtains the flow rate of the exhaust gas flowing through the exhaust gas passage by further using the temperature of the exhaust gas detected by the temperature sensor.

In the present invention, it is preferable that a filter is provided on the upstream side of each of the reducing catalysts in the exhaust gas flowing direction, and each of the pressure sensors is arranged between each pair of the filter and the reducing catalyst.

According to the present invention, a diesel engine comprises the exhaust gas processing device.

According to the present invention, an exhaust gas processing method in which exhaust gas exhausted from a diesel engine is divided to pass through a plurality of exhaust gas passages to be guided to a plurality of reducing catalysts that reduce NOx in the exhaust gas by a reducing agent and the reducing catalysts, the exhaust gas processing method comprises: obtaining a flow rate of the exhaust gas flowing through each of the exhaust gas passages based on at least a pressure in each of the exhaust gas passages on an upstream side of each of the reducing catalysts in an exhaust gas flowing direction; obtaining a flow rate of NOx in each of the exhaust gas passages from the obtained flow rate of the exhaust gas in each of the exhaust gas passages and a concentration of the NOx contained in the exhaust gas on the upstream side of each of the reducing catalysts in the exhaust gas flowing direction; and obtaining an amount of reducing agent to be given to each of the reducing catalysts from the obtained flow rate of NOx in each of the exhaust gas passages.

In the present invention, it is preferable that the obtaining the flow rate of the exhaust gas flowing through each of the exhaust gas passages includes obtaining a flow rate ratio of the exhaust gas flowing through each of the exhaust gas passages based on a pressure in each of the exhaust gas passages and obtaining the flow rate of the exhaust gas flowing through each of the exhaust gas passages based on the obtained flow rate ratio and a total flow rate of the exhaust gas.

In the present invention, it is preferable that the total flow rate of the exhaust gas is obtained from an intake air amount of the diesel engine and a fuel injection amount to the diesel engine.

In the present invention, it is preferable that obtaining the flow rate of the exhaust gas flowing through each of the exhaust gas passages includes obtaining the flow rate of the exhaust gas flowing through the exhaust gas passage by further using a temperature of the exhaust gas flowing through each of the exhaust gas passages.

Advantageous Effects of Invention

The present invention can accurately supply an appropriate amount of reducing agent to each catalyst when processing exhaust gas exhausted from a diesel engine by using a plurality of catalysts that reduces NOx to reduce NOx.

DESCRIPTION OF EMBODIMENTS

A mode for carrying out the present invention (an embodiment) will be described with reference to the drawings. In the embodiment, a flow rate of a fluid, that is, an amount of intake air, a flow rate of exhaust gas, and the like, are a mass flow rate.

<Diesel Engine>

Figure 1:
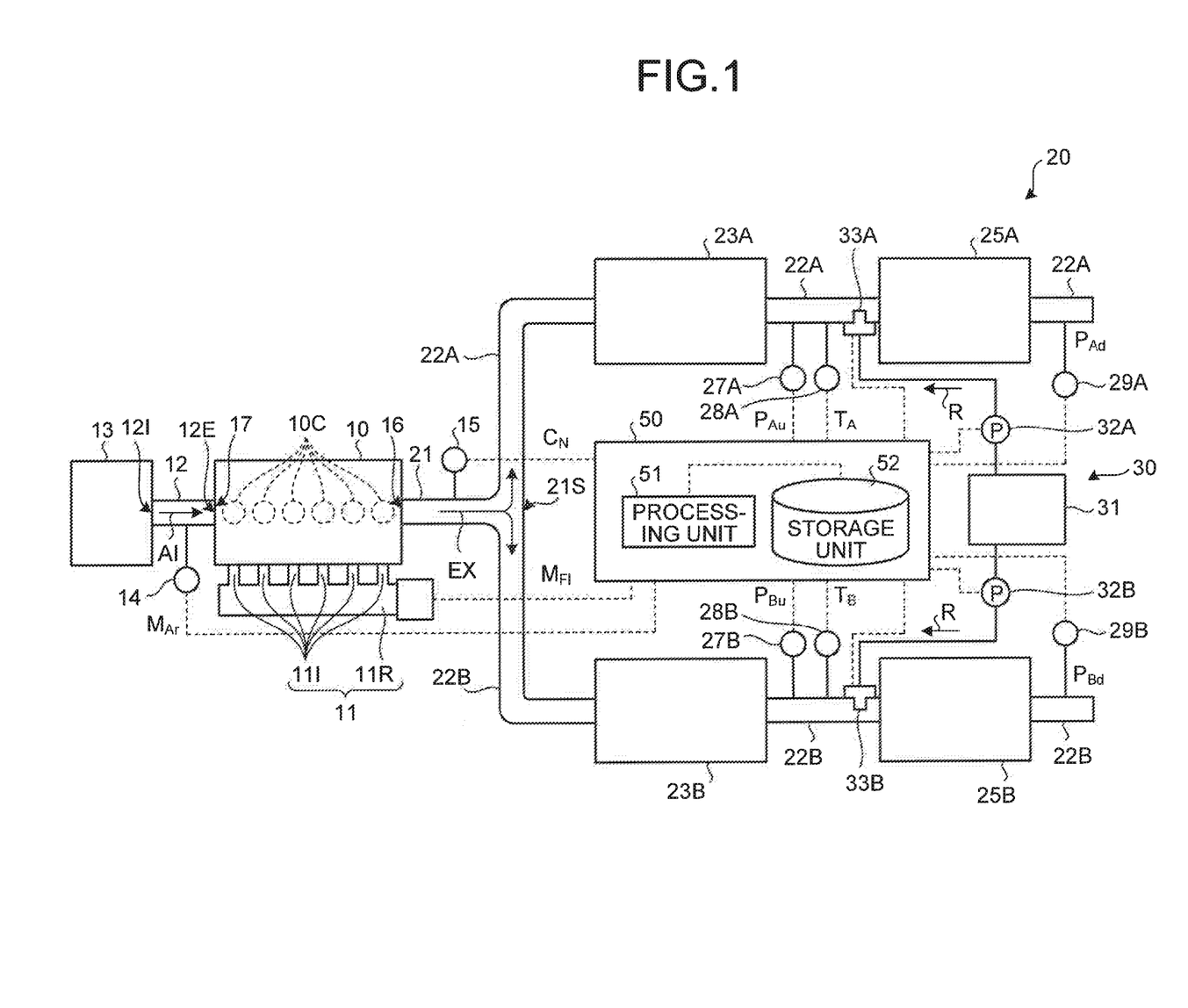
FIG. 1 is a schematic diagram illustrating a diesel engine including an exhaust gas processing device according to an embodiment.

FIG. 1 is a schematic diagram illustrating a diesel engine including an exhaust gas processing device according to the embodiment. A diesel engine 10 includes an exhaust gas processing device 20. The exhaust gas processing device 20 will be described later. The diesel engine 10 and the exhaust gas processing device 20 are controlled by a control device 50. The diesel engine 10 includes a fuel injection device 11 and an intake pipe 12 used as an intake passage. Further, an exhaust pipe 21 used as an exhaust gas introduction passage included in the exhaust gas processing device 20 is attached to an exhaust port 16 of the diesel engine 10.

An air cleaner 13 for removing dust in air is attached to an inlet port 12I of the intake pipe 12. An outlet port 12E of the intake pipe 12 is attached to an intake port 17 of the diesel engine 10. An intake air amount sensor 14 is attached to the intake pipe 12. The intake air amount sensor 14 detects a flow rate (a mass flow rate in the embodiment) of air AI sucked into the diesel engine 10 through the intake pipe 12. The intake air amount sensor 14 is electrically connected to the control device 50. By such a structure, the control device 50 acquires a measurement value of the intake air amount sensor 14. The control device 50 uses the measurement value of the intake air amount sensor 14 for control of the diesel engine 10 such as control of the exhaust gas processing device 20.

The fuel injection device 11 supplies fuel to the diesel engine 10. More specifically, the fuel injection device 11 injects the fuel to a combustion chamber corresponding to each cylinder 10C included in the diesel engine 10. In the embodiment, the fuel injection device 11 is a so-called common-rail type device including an accumulator 11R and injectors 11I. The fuel injection device 11 is controlled by the control device 50. Specifically, for example, the control device 50 causes an appropriate amount of fuel to be injected from the injectors 11I according to operating conditions such as rotation speed and load of the diesel engine 10. In the embodiment, the fuel injection device 11 is not limited to the common-rail type device.

<Exhaust Gas Processing Device>

The exhaust gas processing device 20 is a device that purifies exhaust gas EX exhausted from the diesel engine 10 and mainly reduces NOx (nitrogen oxide) included in the exhaust gas EX. In the embodiment, the exhaust gas processing device 20 includes first and second branch pipes 22A and 22B as a plurality of exhaust gas passages, a NOx detection sensor 15, first and second catalysts 25A and 25B as reducing catalysts (hereinafter may be referred to as NOx reducing catalysts) that reduce NOx, first and second pressure sensors 27A and 27B as pressure sensors, and the aforementioned control device 50. In the embodiment, the exhaust pipe 21 is also included in the exhaust gas processing device 20. However, the exhaust pipe 21 is not essential for the exhaust gas processing device 20.

In the embodiment, required minimum components of the exhaust gas processing device 20 are the first and second branch pipes 22A and 22B, the NOx detection sensor 15, the first and second catalysts 25A and 25B, the first and second pressure sensors 27A and 27B, and the control device 50. In the embodiment, the exhaust gas processing device 20 further includes first DPF (Diesel Particulate Filter) 23A and second DPF 23B as filters, a first temperature sensor 28A that detects temperature of the exhaust gas EX flowing through the first branch pipe 22A, a second temperature sensor 28B that detects temperature of the exhaust gas EX flowing through the second branch pipe 22B, and third and fourth pressure sensors 29A and 29B as pressure sensors, which are arranged on the downstream side of the NOx reducing catalyst and detect pressure in each exhaust gas passage.

The NOx reducing catalyst converts the NOx into nitrogen and water by using a reducing agent that reduces the NOx. As the NOx reducing catalyst, for example, a vanadium-based catalyst, a zeolite-based catalyst, or the like is used. The exhaust gas processing device 20 may include an oxidation catalyst (AMOX: Ammonia Oxidation Catalyst) for purifying ammonia on the downstream side of the first catalyst 25A and the second catalyst 25B in the flowing direction of the exhaust gas EX.

The exhaust pipe 21 is a passage that guides the exhaust gas EX exhausted from the diesel engine 10 to the first branch pipe 22A and the second branch pipe 22B of the exhaust gas processing device 20. The first branch pipe 22A and the second branch pipe 22B branch from the exhaust pipe 21. The exhaust gas EX flowing through the exhaust pipe 21 branches and flows into the first branch pipe 22A and the second branch pipe 22B at a branch portion 21S at which the first branch pipe 22A and the second branch pipe 22B branch from the exhaust pipe 21. In this way, the first branch pipe 22A and the second branch pipe 22B cause the exhaust gas EX exhausted from the diesel engine 10 to branch into the plurality of passages and pass through the passages.

The NOx detection sensor 15 detects the concentration of the NOx contained in the exhaust gas EX exhausted from the diesel engine 10. The concentration of the NOx contained in the exhaust gas EX does not vary before the exhaust gas EX passes through the first catalyst 25A and the second catalyst 25B if the operating condition of the diesel engine 10 is the same. Therefore, a position where the NOx detection sensor 15 is arranged is not limited to the exhaust pipe 21. For example, the NOx detection sensor 15 may be arranged at the branch portion 21S or may be arranged at the first branch pipe 22A or the second branch pipe 22B. Therefore, the freedom of arrangement of the NOx detection sensor 15 is relatively high.

In the embodiment, the NOx detection sensor 15 may be arranged on the downstream side of the exhaust port 16 of the diesel engine 10 in the flowing direction of the exhaust gas EX and on the upstream side of the first catalyst 25A and the second catalyst 25B in the flowing direction of the exhaust gas EX. Therefore, for example, a sensor that is provided to detect NOx contained in the exhaust gas EX processed by the first catalyst 25A and the second catalyst 25B on the downstream side of the first catalyst 25A and the second catalyst 25B (on the downstream side in the flowing direction of the exhaust gas EX) is not used to detect the concentration of NOx contained in the exhaust gas EX before flowing into the first catalyst 25A and the second catalyst 25B.

The first catalyst 25A is provided at the first branch pipe 22A and the second catalyst 25B is provided at the second branch pipe 22B. The first catalyst 25A and the second catalyst 25B reduce the NOx in the exhaust gas EX by using a reducing agent R. In other words, the first catalyst 25A and the second catalyst 25B are respectively provided to the first branch pipe 22A and the second branch pipe 22B, which are used as exhaust gas passages, and reduce the NOx in the exhaust gas EX. In the embodiment, unless otherwise noted, the upstream side is the upstream side in the flowing direction of the exhaust gas EX in the exhaust gas processing device 20 and the downstream side is the downstream side in the flowing direction of the exhaust gas EX in the exhaust gas processing device 20.

A necessary amount of reducing agent R is supplied in the first branch pipe 22A on the upstream side of the first catalyst 25A and the second branch pipe 22B on the upstream side of the second catalyst 25B by a reducing agent supply device 30. The reducing agent supply device includes a reducing agent tank 31, a first pump 32A, a second pump 32B, a first injection device 33A, and a second injection device 33B. The control device 50 controls the first pump 32A, the second pump 32B, the first injection device 33A, and the second injection device 33B. The first injection device 33A injects the reducing agent R pressure-fed from the reducing agent tank 31 by the first pump 32A into the first branch pipe 22A. The second injection device 33B injects the reducing agent R pressure-fed from the reducing agent tank 31 by the second pump 32B into the second branch pipe 22B.

In the embodiment, the reducing agent R is urea (more specifically, urea water). The reducing agent R supplied in the first branch pipe 22A and the second branch pipe 22B is decomposed by heat of the exhaust gas EX and changed into ammonia. In the first catalyst 25A and the second catalyst 25B, the NOx and the ammonia cause a catalytic reaction and are converted into nitrogen and water. In this way, the exhaust gas processing device 20 converts the NOx contained in the exhaust gas EX into nitrogen and water by using selective catalyst reduction using urea as the reducing agent R, that is, by using the urea SCR.

The first pressure sensor 27A is arranged on the upstream side of the first catalyst 25A and the second pressure sensor 27B is arranged on the upstream side of the second catalyst 25B. The first pressure sensor 27A detects pressure in the first branch pipe 22A on the upstream side of the first catalyst 25A. The second pressure sensor 27B detects pressure in the second branch pipe 22B on the upstream side of the second catalyst 25B.

The NOx detection sensor 15, the first pressure sensor 27A, and the second pressure sensor 27B, which are described above, are electrically connected to the control device 50. The exhaust gas processing method according to the embodiment is implemented by the control device 50.

For example, a microcomputer unit is used as the control device 50. The control device 50 includes a processing unit 51 and a storage unit 52. The processing unit 51 is, for example, a CPU (Central Processing Unit). The storage unit 52 is, for example, RAM (Random Access Memory), ROM (Read Only Memory), EPROM (Erasable Programmable Read Only Memory), or EEPROM (Electrically Erasable Programmable Read-Only Memory), or a combination of these. The processing unit 51 performs the exhaust gas processing method according to the embodiment, and further performs various control on the diesel engine 10. The storage unit 52 stores a computer program for performing the aforementioned various control and information required for the various control. When the processing unit 51 performs the aforementioned various control, the processing unit 51 reads the aforementioned computer program from the storage unit 52 and executes instructions described in the computer program. In this case, the processing unit 51 reads the information required for the control from the storage unit 52 as needed and acquires information related to a state of the diesel engine 10 from various sensors such as the NOx detection sensor 15, the first pressure sensor 27A, and the second pressure sensor 27B.

When performing the exhaust gas processing method according to the embodiment, the control device 50 acquires detection values of the NOx detection sensor 15, the first pressure sensor 27A, and the second pressure sensor 27B and controls the amount of reducing agent R supplied to the first catalyst 25A and the second catalyst 25B at least based on the detection values. As an example, the control device 50 obtains the flow rate of the exhaust gas EX flowing through the first branch pipe 22A on the upstream side of the first catalyst 25A and the second branch pipe 22B on the upstream side of the second catalyst 25B based on the detection values of the first pressure sensor 27A and the second pressure sensor 27B. Then, the control device 50 obtains the flow rate of NOx in the first branch pipe 22A and the second branch pipe 22B from the obtained flow rate of the exhaust gas EX in the first branch pipe 22A and the second branch pipe 22B and the concentration of NOx in the exhaust gas EX detected by the NOx detection sensor 15. Thereafter, the control device 50 obtains the amount of reducing agent R given to the first catalyst 25A and the second catalyst 25B from the obtained flow rate of NOx in the first branch pipe 22A and the second branch pipe 22B.

When obtaining the flow rate of the exhaust gas EX in the first branch pipe 22A and the second branch pipe 22B, the control device 50 obtains a flow rate ratio of the exhaust gas EX flowing through the first branch pipe 22A and the second branch pipe 22B based on the detection values of the first pressure sensor 27A and the second pressure sensor 27B. Subsequently, the control device 50 obtains the flow rate of the exhaust gas EX flowing through the first branch pipe 22A and the second branch pipe 22B based on the obtained flow rate ratio and a total flow rate of the exhaust gas EX. The total flow rate of the exhaust gas EX is a total flow rate of the exhaust gas EX exhausted from the diesel engine 10. The total flow rate corresponds to the flow rate of the exhaust gas EX flowing through the exhaust pipe 21.

The total flow rate of the exhaust gas EX can be obtained from, for example, the amount of air taken into the diesel engine 10 and the amount of fuel injected into the diesel engine 10. The amount of air taken into the diesel engine 10 can be detected by the intake air amount sensor 14. The amount of fuel injected into the diesel engine 10 is calculated from the operating condition of the diesel engine 10 by the control device 50 that controls the diesel engine 10.

The first DPF 23A is provided on the upstream side of the first catalyst 25A and the second DPF 23B is provided on the upstream side of the second catalyst 25B. The first temperature sensor 28A is provided on the upstream side of the first catalyst 25A and the second temperature sensor 28B is provided on the upstream side of the second catalyst 25B. The pressure sensors provided on the downstream side of the NOx reducing catalyst are specifically the third pressure sensor 29A and the fourth pressure sensor 29B. The third pressure sensor 29A is arranged on the downstream side of the first catalyst 25A and detects pressure in the first branch pipe 22A at this portion. The fourth pressure sensor 29B is arranged on the downstream side of the second catalyst 25B and detects pressure in the second branch pipe 22B at this portion.

The first temperature sensor 28A, the second temperature sensor 28B, the third pressure sensor 29A, and the fourth pressure sensor 29B are electrically connected to the control device 50. When performing the exhaust gas processing method according to the embodiment, the control device 50 acquires detection values of the first temperature sensor 28A, the second temperature sensor 28B, the third pressure sensor 29A, and the fourth pressure sensor 29B in addition to detection values of the NOx detection sensor 15, the first pressure sensor 27A, and the second pressure sensor 27B and controls the amount of reducing agent R supplied to the first catalyst 25A and the second catalyst 25B based on the detection values. The first temperature sensor 28A may detect the temperature of the exhaust gas EX in the first catalyst 25A and the second temperature sensor 28B may detect the temperature of the exhaust gas EX in the second catalyst 25B.

It is preferable that the first pressure sensor 27A is arranged between the first DPF 23A and the first catalyst 25A and the second pressure sensor 27B is arranged between the second DPF 23B and the second catalyst 25B. The first DPF 23A and the second DPF 23B rectify the exhaust gas EX, so that the accuracy of detection of the first pressure sensor 27A and the second pressure sensor 27B is improved by the aforementioned arrangement. In particular, when the diesel engine 10 has a turbocharger, turbulence of flow of the exhaust gas EX exhausted from a turbine is large, so that a rectifying effect of flow of the exhaust gas EX by the first DPF 23A and the second DPF 23B is large. When the exhaust gas processing device 20 includes the first DPF 23A and the second DPF 23B, an oxidation catalyst (for example, DOC: Diesel Oxidation Catalyst) may be provided on the upstream side of the first DPF 23A and the second DPF 23B.

The exhaust gas processing device 20 causes the passage of the exhaust gas EX to branch into a plurality of passages (in the embodiment, two passages) and processes the exhaust gas EX by the NOx reducing catalyst arranged in each passage in order to process the exhaust gas EX exhausted from the diesel engine 10 having a large displacement. The exhaust gas processing device 20 has to obtain accurate flow rates of the exhaust gas EX flowing through these passages in order to accurately supply an appropriate amount of reducing agent R to the first catalyst 25A and the second catalyst 25B included in the exhaust gas processing device 20. Therefore, when the exhaust gas processing device 20 processes the exhaust gas EX exhausted from the diesel engine 10, the exhaust gas processing device 20 performs the exhaust gas processing method according to the embodiment to improve the degree of accuracy when obtaining the flow rates of the exhaust gas EX flowing through a plurality of NOx reducing catalysts.

In the embodiment, when the diesel engine 10 has a turbocharger, a compressor of the turbocharger is arranged on the downstream side of the intake air amount sensor 14 illustrated in FIG. 1 (on the downstream side in a direction in which the air AI flows). The compressor compresses the air AI after its flow rate is measured by the intake air amount sensor 14. The flow rate of the air AI measured by the intake air amount sensor 14 is a mass flow rate. Therefore, even when the diesel engine 10 has a turbocharger, the measurement of the flow rate of the air AI taken into the diesel engine 10 is not affected. Therefore, the aforementioned calculation of the total flow rate of the exhaust gas EX is not affected.

In the embodiment, the diesel engine 10 may include an EGR (Exhaust Gas Recirculation) device. The EGR device is a device that returns a part of the exhaust gas EX exhausted from the diesel engine 10 to an air intake side, more specifically, to the intake pipe 12. The EGR only returns a part of the exhaust gas EX exhausted from the diesel engine 10 to the air intake side, so that the total flow rate of the exhaust gas EX does not change in the entire diesel engine 10. Therefore, even when the diesel engine 10 includes the EGR, the aforementioned calculation of the total flow rate of the exhaust gas EX is not affected.

<Modified Example of Exhaust Gas Processing Device>

Figure 2:
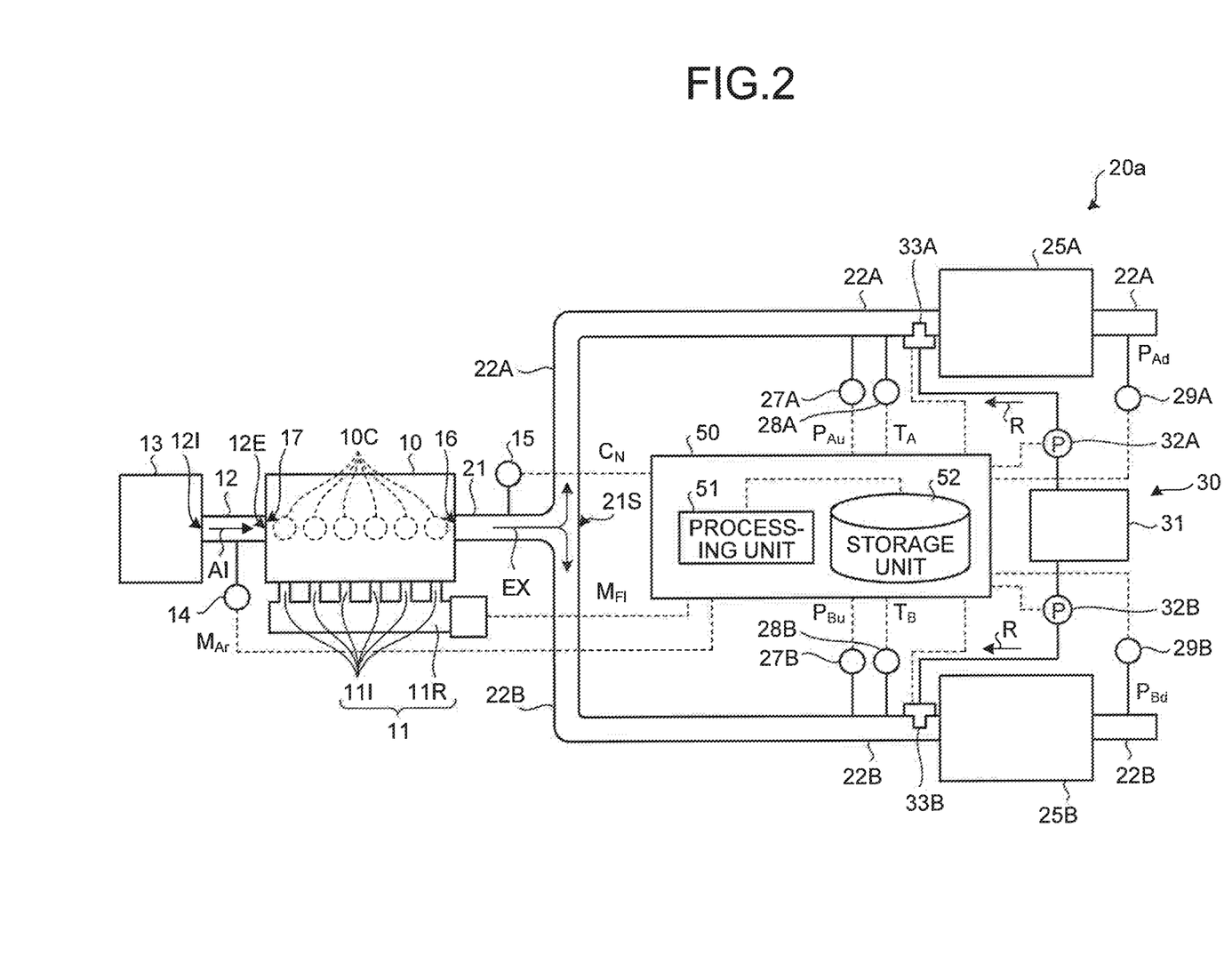
FIG. 2 is a schematic diagram illustrating a diesel engine including an exhaust gas processing device according to a modified example of the embodiment.

FIG. 2 is a schematic diagram illustrating a diesel engine including an exhaust gas processing device according to a modified example of the embodiment. An exhaust gas processing device 20A illustrated in FIG. 2 does not include the first DPF 23A and the second DPF 23B included in the exhaust gas processing device 20 illustrated in FIG. 1. In this way, the first DPF 23A and the second DPF 23B may be omitted or may be used as needed. Further, the first temperature sensor 28A, the second temperature sensor 28B, the third pressure sensor 29A, and the fourth pressure sensor 29B are not necessarily required for the exhaust gas processing device 20A. The first temperature sensor 28A, the second temperature sensor 28B, the third pressure sensor 29A, and the fourth pressure sensor 29B may be included in the exhaust gas processing device 20A as needed.

The technique described in Patent Literature 1 uses a front and rear differential pressure of the exhaust gas purifier (corresponding to the first catalyst 25A and the second catalyst 25B). However, the front and rear differential pressure of the exhaust gas purifier varies according to a state of the exhaust gas purifier, so that it is difficult to measure the front and rear differential pressure by one pressure sensor for one exhaust gas purifier when using pressure sensor for the measurement. The exhaust gas processing device 20A does not include the third pressure sensor 29A and the fourth pressure sensor 29B included in the exhaust gas processing device 20 illustrated in FIG. 1, so that the exhaust gas processing device 20A can obtain the flow rate of the exhaust gas EX flowing through the first catalyst 25A by only the first pressure sensor 28A and can obtain the flow rate of the exhaust gas EX flowing through the second catalyst 25B by only the second pressure sensor 28B. In other words, it is possible to obtain the flow rate of the exhaust gas EX flowing through the catalyst by using one pressure sensor for one catalyst. Next, the exhaust gas processing method according to the embodiment will be described in detail.

<First Example of Exhaust Gas Processing Method>

The exhaust gas processing method according to the embodiment can be implemented by using the NOx detection sensor 15, the first pressure sensor 27A, and the second pressure sensor 27B, which are included in the exhaust gas processing device 20. The first catalyst 25A and the second catalyst 25B, which are included in the exhaust gas processing device 20, can be regarded as a resistive element of the first branch pipe 22A and the second branch pipe 22B, respectively.

The first catalyst 25A and the second catalyst 25B are, for example, a carrier which has a plurality of passages where fluid flows and which carries a NOx reducing catalyst. Therefore, the first catalyst 25A and the second catalyst 25B become resistive elements when the exhaust gas EX flows. Therefore, the first catalyst 25A and the second catalyst 25B can be regarded as a resistive element of the first branch pipe 22A and the second branch pipe 22B, respectively. By doing this, a flow rate $Q_{mA}$ (may be referred to as a first flow rate) of the exhaust gas EX flowing through the first catalyst 25A and a flow rate $Q_{mB}$ (may be referred to as a second flow rate) of the exhaust gas EX flowing through the second catalyst 25B can be represented by Formula (1) and Formula (2), respectively. Both of the first flow rate $Q_{mA}$ and the second flow rate $Q_{mB}$ are a mass flow rate. In the description below, $\sqrt{(P_{Au} \times (P_{Au} - P_{Ad})/T_A)}$ and $\sqrt{(P_{Bu} \times (P_{Bu} - P_{Bd})/T_B)}$, which are a square root of the right side of Formula (1) and Formula (2), are arbitrarily referred to as a pressure parameter.

$$Q_{mA} = k \times \sqrt{\frac{P_{Au} \times (P_{Au} - P_{Ad})}{T_A}} \quad (1)$$

$$Q_{mB} = k \times \sqrt{\frac{P_{Bu} \times (P_{Bu} - P_{Bd})}{T_B}} \quad (2)$$

$P_{Au}$ is a detection value of the first pressure sensor 27A and is a pressure of the exhaust gas EX flowing through the first branch pipe 22A on the upstream side of the first catalyst 25A and $P_{Bu}$ is a detection value of the second pressure sensor 27B and is a pressure of the exhaust gas EX flowing through the second branch pipe 22B on the upstream side of the second catalyst 25B. Both of these are an absolute pressure. $P_{Ad}$ is a pressure of the exhaust gas EX flowing through the first branch pipe 22A on the downstream side of the first catalyst 25A and $P_{Bd}$ is a pressure of the exhaust gas EX flowing through the second branch pipe 22B on the downstream side of the second catalyst 25B. $P_{Ad}$ and $P_{Bd}$ can be assumed to be the atmospheric pressure. In this case, as both of $P_{Ad}$ and $P_{Bd}$, for example, a measurement value of an atmospheric pressure sensor included in control of the diesel engine 10 or a vehicle in which the diesel engine 10 is provided may be used, or an average atmospheric pressure may be used as a constant. When the exhaust gas processing device 20 includes the third pressure sensor 29A and the fourth pressure sensor 29B described above, these sensors may measure $P_{Ad}$ and $P_{Bd}$. In this case, the measurement accuracy of the first flow rate $Q_{mA}$ and the second flow rate $Q_{mB}$ improves.

Here, k is a constant and is $a \times C \times A \times \sqrt{(R)}$. Here, a is a constant, C is a flow rate coefficient of the first catalyst 25A or the second catalyst 25B, A is a gross-sectional area (may be referred to as a passage area) of a passage through which the exhaust gas EX flows in the first catalyst 25A or the second catalyst 25B, and R is a gas constant. In Formula (1) and Formula (2) illustrated above, k is regarded as the same by assuming that the first catalyst 25A and the second catalyst 25B are the same. However, the constant k may be individually determined for each catalyst from the flow rate coefficient and the passage area of each catalyst. Further, k may be determined from a, C, A, and R by using the above formula or may be determined based on actual measurements as described below.

$T_A$ is a temperature of the exhaust gas EX on the upstream side of the first catalyst 25A and is a temperature (may be referred to as a first temperature) of the exhaust gas EX immediately before the exhaust gas EX enters the first catalyst 25A. $T_B$ is a temperature of the exhaust gas EX on the upstream side of the second catalyst 25B and is a temperature (may be referred to as a second temperature) of the exhaust gas EX immediately before the exhaust gas EX enters the second catalyst 25B. Further, for example, the temperatures $T_A$ and $T_B$ may be estimated from a detection value of an exhaust gas temperature sensor included in the diesel engine 10.

When estimating the temperatures $T_A$ and $T_B$ from a detection value of the exhaust gas temperature sensor described above, the temperatures $T_A$ and $T_B$ can be estimated by correcting the detection value of the exhaust gas temperature sensor based on a heat radiation amount or the like of the first branch pipe 22A, the second branch pipe 22B, the first DPF 23A, and the second DPF 23B. In this case, the temperatures $T_A$ and $T_B$ may be regarded as the same. When the exhaust gas processing device 20 includes the first temperature sensor 28A and the second temperature sensor 28B described above, detection values of the first temperature sensor 28A and the second temperature sensor 28B can be determined as the temperatures $T_A$ and $T_B$.

The pressure on the downstream side of the first catalyst 25A and the second catalyst 25B is substantially the atmospheric pressure, so that even when the pressure of the exhaust gas EX on the downstream side of the first catalyst 25A and the second catalyst 25B is used, it is very difficult to detect a significant pressure variation of the exhaust gas EX that has passed through the first catalyst 25A and the second catalyst 25B. Therefore, if the flow rate of the exhaust gas EX flowing through the first catalyst 25A and the second catalyst 25B is obtained based on only the pressure of the exhaust gas EX on the downstream side of the first catalyst 25A and the second catalyst 25B, the accuracy of the flow rate is very low.

As described above, the first catalyst 25A and the second catalyst 25B can be regarded as a resistive element of the first branch pipe 22A and the second branch pipe 22B, respectively. Therefore, the exhaust gas processing device 20 can reliably detect the pressure of the exhaust gas EX flowing through the first branch pipe 22A and the pressure of the exhaust gas EX flowing through the second branch pipe 22B, more specifically, the pressure of the exhaust gas EX flowing through the first branch pipe 22A on the upstream side of the first catalyst 25A and the pressure of the exhaust gas EX flowing through the second branch pipe 22B on the upstream side of the second catalyst 25B, by the first pressure sensor 27A and a second pressure sensor 27B. In other words, the first catalyst 25A is provided as a resistive element to fluid on the downstream side of the first pressure sensor 27A and the second catalyst 25B is provided as a resistive element to fluid on the downstream side of the second pressure sensor 27B, so that it is possible to secure the pressure and a pressure variation of the exhaust gas EX on the upstream side of the first catalyst 25A and the second catalyst 25B. Therefore, the exhaust gas processing device 20 can measure the pressure of the exhaust gas EX in a state in which the pressure of the exhaust gas EX is relatively high, so that the exhaust gas processing device 20 can suppress degradation in accuracy when measuring the pressure of the exhaust gas EX, which is used to obtain the first flow rate $Q_{mA}$ and the second flow rate $Q_{mB}$, that is, the pressure of the exhaust gas EX flowing through the first branch pipe 22A and the pressure of the exhaust gas EX flowing through the second branch pipe 22B. As a result, the exhaust gas processing device 20 can improve accuracy when measuring the first flow rate $Q_{mA}$ and the second flow rate $Q_{mB}$ by using at least the pressure of the exhaust gas EX on the upstream side of the first catalyst 25A and the second catalyst 25B. Further, the exhaust gas processing device 20 can accurately supply an appropriate amount of reducing agent to the first catalyst 25A and the second catalyst 25B.

Figure 3:
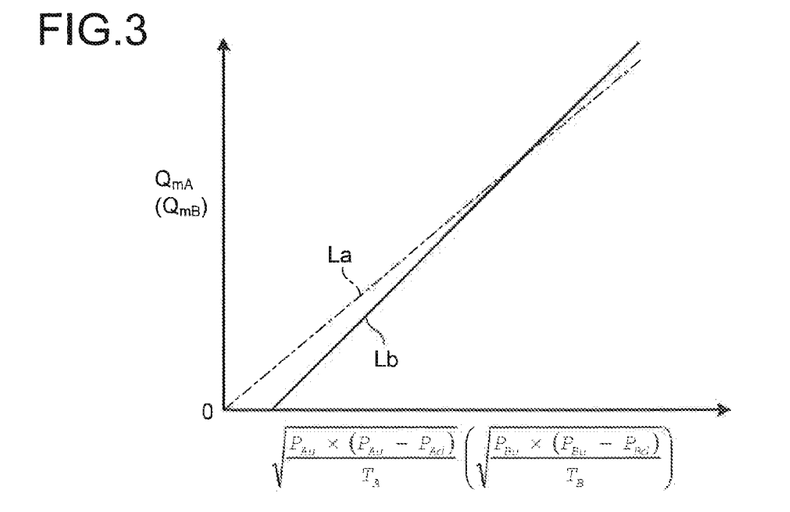
FIG. 3 is a diagram illustrating a relationship between a flow rate and a pressure parameter in a first reducing catalyst.

FIG. 3 is a diagram illustrating a relationship between a flow rate and a pressure parameter in a first reducing catalyst. A straight line La of an alternate long and short dash line in FIG. 3 represents a relationship between a flow rate $Q_{mA}$ ($Q_{mB}$) shown in Formula (1) and a pressure parameter $\sqrt{(P_{Au} \times (P_{Au} - P_{Ad})/T_A)}$ ($\sqrt{(P_{Bu} \times (P_{Bu} - P_{Bd})/T_B)}$). The relationship between the flow rate and the pressure parameter is theoretically a linear function with a slope k passing through the origin as illustrated by the straight line La. However, for the first catalyst 25A and the second catalyst 25B, when obtaining an approximate expression by using a least-squares method or the like from a result of actually measuring the flow rate $Q_{mA}$ and the pressure parameter, a linear function that does not pass through the origin may be obtained as illustrated by the solid straight line Lb in FIG. 3. In this case, when the approximate expression based on the actual measurements is used, the accuracy of the first flow rate $Q_{mA}$ and the second flow rate $Q_{mB}$ is improved. In the embodiment, an example is described in which the relationship between the flow rate $Q_{mA}$ and the pressure parameter is a linear function. However, the function representing the relationship between these is not limited to this. For example, in the embodiment, the relationship between these may be represented by various functions such as a quadratic function, a cubic function, an n-dimensional function (n is a real number), and an exponential function.

Formula (3) and Formula (4) illustrate formulae of the first flow rate $Q_{mA}$ and the second flow rate $Q_{mB}$ in a case in which they are represented by a linear function that does not pass through the origin based on the actual measurements. Here, A1 and A2 in Formula (3) and B1 and B2 in Formula (4) are constants. The constant A1 is, for example, a slope of a linear function that passes through the origin as illustrated by the alternate long and short dash line La in FIG. 3 or a slope of a linear function that does not pass through the origin as illustrated by the solid straight line Lb. The constant A2 is a value of an intercept on a $Q_{mA}$ axis of a linear function that passes through the origin as illustrated by the alternate long and short dash line La or a linear function that does not pass through the origin as illustrated by the solid straight line Lb. When the relationship between the flow rate $Q_{mA}$ and the pressure parameter is a linear function that passes through the origin as illustrated by the alternate long and short dash line La, the intercept is 0, so that the constant A2 is 0. Therefore, the constants A1 and A2 can be determined from a linear function representing the straight line La or the straight line Lb as illustrated in FIG. 3. The same as for the constants A1 and A2 goes for the constants B1 and B2. In this way, the constants A1, A2, B1, and B2 may be determined based on actual measurements or may be determined by a simulation, a theoretical calculation, or the like.

$$Q_{mA} = A1 \times \sqrt{\frac{P_{Au} \times (P_{Au} - P_{Ad})}{T_A}} + A2 \quad (3)$$

$$Q_{mB} = B1 \times \sqrt{\frac{P_{Bu} \times (P_{Bu} - P_{Bd})}{T_B}} + B2 \quad (4)$$

When the first flow rate $Q_{mA}$ and the second flow rate $Q_{mB}$ are obtained from Formula (1) and Formula (2) or Formula (3) and Formula (4), a flow rate $Q_{mAN}$ of NOx flowing through the first catalyst 25A (may be referred to as a first NOx flow rate) and a flow rate $Q_{mBN}$ of NOx flowing through the second catalyst 25B (may be referred to as a second NOx flow rate) are obtained from Formula (5) and Formula (6) based on the concentration of NOx contained in the exhaust gas EX exhausted from the diesel engine 10. In these Formulae, $C_N$ is the concentration of NOx contained in the exhaust gas EX exhausted from the diesel engine 10, $m_N$ is the mass of NOx per mol, and $m_E$ is the mass of the exhaust gas EX per mol. Both of $Q_{mAN}$ and $Q_{mBN}$ are a mass flow rate.

$$Q_{mAN} = Q_{mA} \times C_N \times \frac{m_N}{m_E} \quad (5)$$

$$Q_{mBN} = Q_{mB} \times C_N \times \frac{m_N}{m_E} \quad (6)$$

The amount of NOx flowing through the first catalyst 25A and the second catalyst 25B is known from Formula (5) and Formula (6). Therefore, it is possible to obtain the amount of reducing agent R required to convert all the NOx flowing through the first catalyst 25A and the second catalyst 25B into nitrogen and water. The amount of required reducing agent R described above can be represented by Formula (7) and Formula (8). In these Formulae, $Q_{mAur}$ is the amount of reducing agent R required for the first catalyst 25A, and $Q_{mBur}$ is the amount of reducing agent R required for the second catalyst 25B. Further, β is ANR (Ammonia to NOx Ratio) and γ is a mass ratio between the reducing agent R (in the embodiment, urea water) and NOx when ANR=1 is established.

$$Q_{mAur} = \beta \times \gamma \times Q_{mAN} \quad (7)$$

$$Q_{mBur} = \beta \times \gamma \times Q_{mBN} \quad (8)$$

A first example of the exhaust gas processing method according to the embodiment can improve accuracy when measuring the first flow rate $Q_{mA}$ and the second flow rate $Q_{mB}$ by using at least the pressures of the first branch pipe 22A and the second branch pipe 22B on the upstream side of the first catalyst 25A and the second catalyst 25B. Therefore, the first example can accurately obtain the flow rate of NOx flowing through the first catalyst 25A and the second catalyst 25B, so that the first example can accurately supply an appropriate amount of reducing agent R to the first catalyst 25A and the second catalyst 25B by using the obtained flow rate of NOx.

<Second Example of Exhaust Gas Processing Method>

A second example of the exhaust gas processing method according to the embodiment is similar to the first example described above. However, the second example is different from the first example in that the second example uses a flow rate ratio $Q_{mA}/Q_{mB}$ that is a ratio between the first flow rate $Q_{mA}$ and the second flow rate $Q_{mB}$ based on the pressures of the first branch pipe 22A and the second branch pipe 22B on the upstream side of the first catalyst 25A and the second catalyst 25B and the total flow rate of the exhaust gas EX exhausted from the diesel engine 10.

The flow rate ratio α obtained based on the pressures of the first branch pipe 22A and the second branch pipe 22B on the upstream side of the first catalyst 25A and the second catalyst 25B is represented by Formula (9). The first flow rate $Q_{mA}$ and the second flow rate $Q_{mB}$ in Formula (9) can be obtained respectively from Formula (1) and Formula (2) described above. When the first temperature $T_A$ and the second temperature $T_B$ may be regarded as the same, $T_B/T_A$ in Formula (9) can be regarded as 1, so that Formula (9) becomes Formula (10). The case in which the first temperature $T_A$ and the second temperature $T_B$ can be regarded as the same is, for example, a case in which one is within ±5% of the other. Formula (11) shows the flow rate ratio α between the first flow rate $Q_{mA}$ obtained from Formula (3) described above and the second flow rate $Q_{mB}$ obtained from Formula (4) described above.

$$\alpha = \frac{Q_{mA}}{Q_{mB}} = \sqrt{\frac{P_{Au} \times (P_{Au} - P_{Ad}) \times T_B}{P_{Bu} \times (P_{Bu} - P_{Bd}) \times T_A}} \quad (9)$$

$$\alpha = \sqrt{\frac{P_{Au} \times (P_{Au} - P_{Ad})}{P_{Bu} \times (P_{Bu} - P_{Bd})}} \quad (10)$$

$$\alpha = \frac{Q_{mA}}{Q_{mB}} = \frac{A1 \times \sqrt{\frac{P_{Au} \times (P_{Au} - P_{Ad})}{T_A}} + A2}{B1 \times \sqrt{\frac{P_{Bu} \times (P_{Bu} - P_{Bd})}{T_B}} + B2} \quad (11)$$

When the exhaust gas processing device 20 includes first temperature sensor 28A and the second temperature sensor 28B, the flow rate ratio α is obtained by using Formula (9) or Formula (11). When the first temperature sensor 28A and the second temperature sensor 28B are used, if either one cannot detect a correct temperature, the flow rate ratio α may be obtained by using one temperature sensor that operates correctly assuming that the exhaust gas EX on the side of the first catalyst 25A and the exhaust gas EX on the side of the second catalyst 25B are the same temperature. By doing so, the reliability is improved. When one of both temperature sensors cannot detect a correct temperature, if the exhaust gas EX on the side of the first catalyst 25A and the exhaust gas EX on the side of the second catalyst 25B are assumed to have the same temperature, Formula (9) becomes Formula (10).

The total flow rate of the exhaust gas EX exhausted from the diesel engine 10 is a total flow rate (mass flow rate) of the exhaust gas EX exhausted from the exhaust port 16 of the diesel engine 10. When using the aforementioned flow rate ratio α and the total flow rate $Q_m$ of the exhaust gas EX, a first flow rate $Q_{mA}'$ that is a flow rate of exhaust gas EX flowing through the first catalyst 25A and a second flow rate $Q_{mB}'$ that is a flow rate of exhaust gas EX flowing through the second catalyst 25B are represented as Formula (12) and Formula (13), respectively. The first flow rate $Q_{mA}'$ and the second flow rate $Q_{mB}'$ which are obtained by using the flow rate ratio α are added with "'" in order to be distinguished from the first flow rate $Q_{mA}$ and the second flow rate $Q_{mB}$ which are obtained based on only the pressures $P_{Au}$ and $P_{Bu}$ on the upstream side of the first catalyst 25A and the second catalyst 25B.

$$Q_{mA}' = \frac{\alpha}{\alpha+1} \times Q_m \quad (12)$$

$$Q_{mB}' = \frac{1}{\alpha+1} \times Q_m \quad (13)$$

The total flow rate $Q_m$ of the exhaust gas EX can be obtained by a sum of the intake air amount $M_{Ar}$ of the diesel engine 10 detected by the intake air amount sensor 14 included in the diesel engine 10 and an amount of fuel (fuel injection amount) $M_{F1}$ (mass) per unit time (for example, per second), which is injected to the diesel engine 10 by the fuel injection device 11. Alternatively, the total flow rate $Q_m$ of the exhaust gas EX may be obtained by using an air-fuel ratio. For example, the fuel injection amount $M_{F1}$ may be obtained from the intake air amount $M_{Ar}$ of the diesel engine 10 detected by the intake air amount sensor 14 and the air-fuel ratio, and the total flow rate $Q_m$ of the exhaust gas EX may be obtained from the intake air amount $M_{Ar}$ and the fuel injection amount $M_{F1}$ obtained from the intake air amount $M_{Ar}$ and the air-fuel ratio. Further, the intake air amount $M_{Ar}$ of the diesel engine 10 may be obtained from the fuel injection amount $M_{F1}$ and the air-fuel ratio, and the total flow rate $Q_m$ of the exhaust gas EX may be obtained from the fuel injection amount $M_{F1}$ and the intake air amount $M_{Ar}$ obtained from the fuel injection amount $M_{F1}$ and the air-fuel ratio. In these examples, as the air-fuel ratio, a typical value of air-fuel ratio in the operating condition of the diesel engine 10 can be used. In addition to these examples, further, the intake air amount $M_{Ar}$ may be obtained from volumetric efficiency of the diesel engine 10 and temperature, pressure, and flow rate of the intake air, and the total flow rate $Q_m$ of the exhaust gas EX may be obtained from the obtained intake air amount $M_{Ar}$ and the fuel injection amount $M_{F1}$.

As described above, the total flow rate $Q_m$ of the exhaust gas EX can be obtained by a plurality of methods. In any method, the control device 50 acquires a detection value of a sensor such as the intake air amount sensor 14 and obtains the total flow rate $Q_m$ of the exhaust gas EX by performing a certain calculation on the aforementioned detection value. Therefore, in the embodiment, the control device 50 and a sensor such as the intake air amount sensor 14 correspond to an exhaust gas total flow rate detection unit that obtains the total flow rate of the exhaust gas EX exhausted from the diesel engine 10.

When the first flow rate $Q_{mA}'$ and the second flow rate $Q_{mB}'$ are obtained from Formula (12) and Formula (13), it is possible to obtain the first NOx flow rate $Q_{mAN}$ and the second NOx flow rate $Q_{mBN}$ by giving the first flow rate $Q_{mA}'$ and the second flow rate $Q_{mB}'$ to $Q_{mA}$ and $Q_{mB}$, respectively, in Formula (5) and Formula (6) described above. When the flow rate ratio α is not used, the sum of the first flow rate $Q_{mA}$ and the second flow rate $Q_{mB}$ may not be the total flow rate $Q_m$ of the exhaust gas EX due to measurement errors and the like of the first pressure sensor 27A and the second pressure sensor 27B. As known from Formula (12) and Formula (13), when the flow rate ratio α is used, the sum of the first flow rate $Q_{mA}'$ and the second flow rate $Q_{mB}'$ becomes the total flow rate $Q_m$ of the exhaust gas EX. Therefore, it is possible to more accurately obtain the flow rates of NOx flowing through the first catalyst 25A and the second catalyst 25B by using the first flow rate $Q_{mA}'$ and the second flow rate $Q_{mB}'$ obtained based on the flow rate ratio α. As a result, it is possible to more accurately supply an appropriate amount of reducing agent R to the first catalyst 25A and the second catalyst 25B in the second example. Next, an example of a processing flow of the exhaust gas processing method according to the second example will be described.

<Processing Flow of Exhaust Gas Processing Method>

Figure 4:
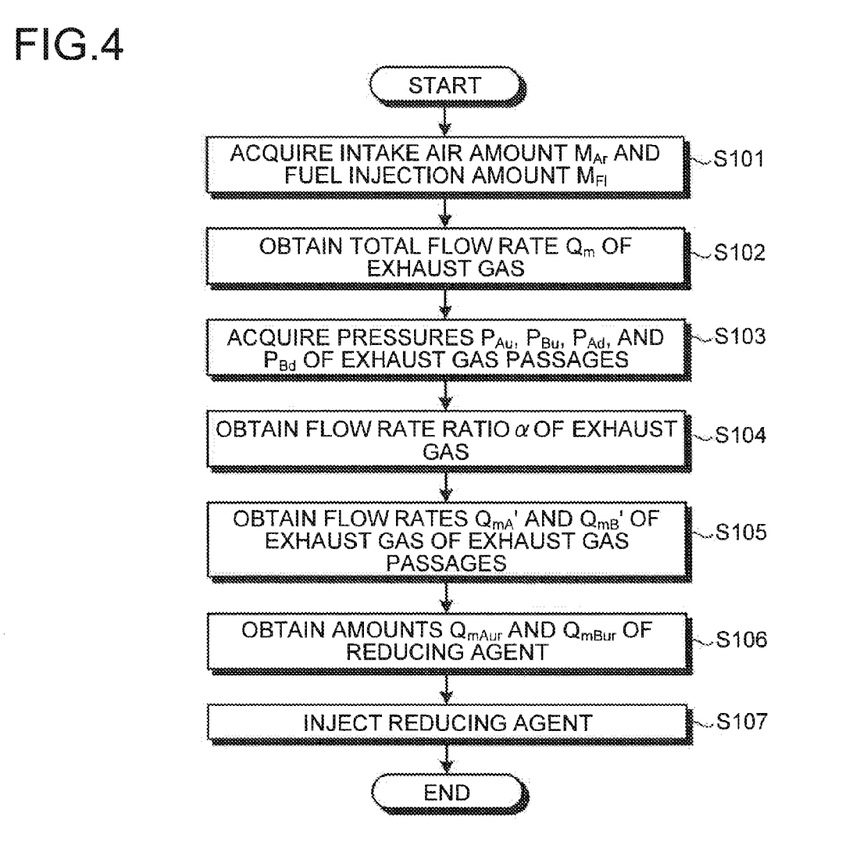
FIG. 4 is a processing flow diagram of the exhaust gas processing method according to the embodiment.

FIG. 4 is a processing flow diagram of the exhaust gas processing method according to the embodiment. In the description below, the flow rate of a fluid, that is, the amount of intake air, the flow rate of the exhaust gas EX, and the like, are a mass flow rate. When executing the exhaust gas processing method according to the embodiment, in step S101, the control device 50 illustrated in FIG. 1 acquires a detection value of the intake air amount sensor 14, that is, the intake air amount $M_{Ar}$ of the diesel engine 10, and the fuel injection amount $M_{F1}$ of the fuel injection device 11. When the control device 50 controls the diesel engine 10, the control device 50 calculates the fuel injection amount $M_{F1}$ according to the operating condition, so that the control device 50 acquires a result of the calculation in step S101. The intake air amount $M_{Ar}$ and the fuel injection amount $M_{F1}$ are inputted into the processing unit 51 of the control device 50 (see FIG. 1).

Next, in step S102, the control device 50 obtains the total flow rate $Q_m$ of the exhaust gas EX from the intake air amount $M_{Ar}$ and the fuel injection amount $M_{F1}$ acquired in step S101. In the present example, the control device 50 obtains the total flow rate $Q_m$ of the exhaust gas EX by summing the intake air amount $M_{Ar}$ and the fuel injection amount $M_{F1}$. The total flow rate $Q_m$ of the exhaust gas EX is outputted from the processing unit 51.

Next, in step S103, the control device 50 acquires the pressure of each exhaust gas passage, which is required to obtain the pressure of the exhaust gas EX flowing through each exhaust gas passage of the exhaust gas processing device 20 illustrated in FIG. 1. In the present example, the pressures of the first branch pipe 22A and the second branch pipe 22B illustrated in FIG. 1 are acquired. Specifically, the acquired pressures are the pressures $P_{Au}$, $P_{Bu}$, $P_{Ad}$, and $P_{Bd}$ of the exhaust gas EX on the upstream side and the downstream side of the first catalyst 25A and the second catalyst 25B illustrated in FIG. 1. The control device 50 acquires the pressures $P_{Au}$ and $P_{Bu}$ of the exhaust gas EX on the upstream side of the first catalyst 25A and the second catalyst 25B from the first pressure sensor 27A and the second pressure sensor 27B illustrated in FIG. 1. Further, the control device 50 acquires the pressures $P_{Ad}$ and $P_{Bd}$ of the exhaust gas EX on the downstream side of the first catalyst 25A and the second catalyst 25B from the third pressure sensor 29A and the second pressure sensor 29B illustrated in FIG. 1. The pressures $P_{Au}$, $P_{Bu}$, $P_{Ad}$, and $P_{Bd}$ are inputted into the processing unit 51.

Next, in step S104, the control device 50 obtains the flow rate ratio α of the exhaust gas EX. When obtaining the flow rate ratio α, the control device 50 obtains the flow rate ratio α by giving the pressures $P_{Au}$, $P_{Bu}$, $P_{Ad}$, and $P_{Bd}$ to one of Formulae (9), (10), and (11). As known from Formula (9), Formula (10), and Formula (11), the flow rate ratio α includes a differential pressure $\Delta P_A$ ($P_{Au}-P_{Ad}$) and a differential pressure $\Delta P_B$ ($P_{Bu}-P_{Bd}$). In the present example, when obtaining the differential pressures $\Delta P_A$ and $\Delta P_B$, all the pressures $P_{Au}$, $P_{Bu}$, $P_{Ad}$, and $P_{Bd}$ are measured. Therefore, even when the pressures $P_{Au}$ and $P_{Bu}$ of the exhaust gas EX on the upstream side of the first branch pipe 22A and the second branch pipe 22B are low, it is possible to suppress degradation of accuracy of the flow rate ratio α. While the pressures $P_{Ad}$ and $P_{Bd}$ of the exhaust gas EX on the downstream side of the first branch pipe 22A and the second branch pipe 22B may be assumed to be the atmospheric pressure, it is possible to reflect variation of the atmospheric pressure on the flow rate ratio α by actually measuring the pressures $P_{Ad}$ and $P_{Bd}$ as in the present example. As a result, it is possible to improve the accuracy of the flow rate ratio α. The flow rate ratio α is outputted from the processing unit 51.

In the embodiment, the pressures $P_{Ad}$ and $P_{Bd}$ of the exhaust gas EX on the downstream side of the first catalyst 25A and the second catalyst 25B may be assumed to be the atmospheric pressure. In this case, the atmospheric pressure may be used as a constant or a detection value of an atmospheric pressure sensor used for control and the like of the diesel engine 10 may be used as the atmospheric pressure. By doing so, there is an advantage to simplify the processing as compared with a case in which the pressures $P_{Ad}$ and $P_{Bd}$ are actually measured.

In addition, when Formula (9) and Formula (11) are used, the control device 50 obtains the temperatures $T_A$ and $T_B$ of the exhaust gas EX on the upstream side of the first catalyst 25A and the second catalyst 25B based on detection values of the first temperature sensor 28A and the second temperature sensor 28B illustrated in FIG. 1. Further, as described above, the control device 50 may estimate the temperature of the exhaust gas EX from the operating condition such as load and rotation speed of the diesel engine 10 and determine obtained estimation values as the temperatures $T_A$ and $T_B$.

After the flow rate ratio α is obtained, in step S105, the control device 50 obtains the first flow rate $Q_{mA}'$ and the second flow rate $Q_{mB}'$ as the flow rates of each exhaust gas passage of the exhaust gas processing device 20 by giving the flow rate ratio α obtained in step S104 and the total flow rate $Q_m$ of the exhaust gas EX obtained in step S101 to Formula (12) and Formula (13). The first flow rate $Q_{mA}'$ and the second flow rate $Q_{mB}'$ are outputted from the processing unit 51. In the present example, the total flow rate $Q_m$ of the exhaust gas EX is obtained in step S102. However, the total flow rate $Q_m$ of the exhaust gas EX may be obtained before step S105.

Next, in step S106, the control device 50 obtains the amounts of reducing agent R to be supplied to the first catalyst 25A and the second catalyst 25B. When obtaining the amount of reducing agent R, the control device 50 gives the first flow rate $Q_{mA}'$ and the second flow rate $Q_{mB}'$ to Formula (5) and Formula (6) and obtains the first NOx flow rate $Q_{mAN}$ and the second NOx flow rate $Q_{mBN}$. Next, the control device 50 gives the obtained first NOx flow rate $Q_{mAN}$ and second NOx flow rate $Q_{mBN}$ to Formula (7) and Formula (8) and obtains the amount $Q_{mAur}$ of reducing agent R to be supplied to the first catalyst 25A and the amount $Q_{mBur}$ of reducing agent R to be supplied to the second catalyst 25B. The amount $Q_{mAur}$ and the amount $Q_{mBur}$ are outputted from the processing unit 51.

After the amounts $Q_{mAur}$ and $Q_{mBur}$ of reducing agent R are obtained, in step S107, the control device 50 injects the reducing agent R, the amounts of which are obtained in step S106, to the first catalyst 25A and the second catalyst 25B. Specifically, the first injection device 33A illustrated in FIG. 1 injects the reducing agent R pressure-fed from the reducing agent tank 31 by the first pump 32A into the first branch pipe 22A, and the second injection device 33B injects the reducing agent R pressure-fed from the reducing agent tank 31 by the second pump 32B into the second branch pipe 22B. After the reducing agent R is injected, steps S101 to S107 are repeatedly performed while the diesel engine 10 is being operated.

Formula (9), Formula (12), Formula (13), and the like, which are required to perform the exhaust gas processing method according to the embodiment, are stored in the storage unit 52 of the control device 50. When performing the exhaust gas processing method according to the embodiment, the processing unit 51 of the control device 50 reads these Formulae from the storage unit 52 and performs calculation.

As described above, in the embodiment, the flow rate of the exhaust gas EX flowing through each exhaust gas passage is obtained based on the pressure in each exhaust gas passage, so that it is possible to obtain the flow rate of the exhaust gas EX flowing through each exhaust gas passage and the flow rate of NOx flowing through each exhaust gas passage with a high degree of accuracy. As a result, in the embodiment, it is possible to accurately supply an appropriate amount of reducing agent R to the NOx reducing catalyst provided in each exhaust gas passage, so that it is possible to reliably convert NOx in the exhaust gas EX into nitrogen and water and suppress generation of ammonia that is not used for conversion of NOx.

Further, in the embodiment, the flow rate of the exhaust gas EX flowing through each exhaust gas passage is obtained based on the pressure in each exhaust gas passage. Therefore, even when the sizes and the specifications of the exhaust gas passages or the NOx reducing catalysts are different from each other, or even when the lengths, the inside diameters, the routes, the curvatures, and the like of the exhaust gas passages are different from each other, it is possible to obtain the flow rate of the exhaust gas EX flowing through each exhaust gas passage and the flow rate of NOx flowing through exhaust gas passage with a high degree of accuracy. As a result, in the embodiment, it is possible to accurately supply an appropriate amount of reducing agent R to each NOx reducing catalyst, so that it is possible to reliably convert NOx in the exhaust gas EX into nitrogen and water and suppress generation of ammonia even when the specifications of the exhaust gas passages are different from each other.

Further, in the embodiment, it is possible to obtain the flow rate of the exhaust gas EX flowing through each NOx reducing catalyst by arranging one pressure sensor on the upstream side of each NOx reducing catalyst. Therefore, it is possible to simplify the structure of the exhaust gas processing device 20 and reduce the manufacturing cost. In the embodiment, further, one pressure sensor may be arranged on the downstream side of each NOx reducing catalyst. By doing this, it is possible to more accurately obtain the flow rate of the exhaust gas EX flowing through each NOx reducing catalyst.

Further, in the embodiment, the flow rate ratio α of the exhaust gas EX flowing through each exhaust gas passage is obtained based on the pressure in each exhaust gas passage. By using the obtained flow rate ratio α, it is possible to obtain the flow rate of the exhaust gas EX flowing through each exhaust gas passage and the flow rate of NOx flowing through each exhaust gas passage with a higher degree of accuracy.

Further, in the embodiment, the total flow rate $Q_m$ of the exhaust gas EX is obtained from the intake air amount $M_{Ar}$ of the diesel engine 10 and the fuel injection amount $M_{F1}$ to the diesel engine 10. These are information necessarily used to control the diesel engine 10 when operating the diesel engine 10. Therefore, it is possible to relatively easily obtain the total flow rate $Q_m$ of the exhaust gas EX by using these. The existing information is used, so that the embodiment can be easily applied to various diesel engines 10 and their exhaust gas processing devices 20. Therefore, the embodiment has an advantage of high versatility.

Further, in the embodiment, a temperature sensor that detects the temperature of the exhaust gas EX flowing through each exhaust gas passage may be provided and the flow rate of the exhaust gas EX may be obtained by further using the temperature of the exhaust gas EX detected by the temperature sensor. By doing this, it is possible to obtain the flow rate of the exhaust gas EX flowing through each exhaust gas passage and the flow rate of NOx flowing through each exhaust gas passage with a higher degree of accuracy.

Further, in the embodiment, a filter may be provided on the upstream side of each NOx reducing catalyst and a pressure sensor may be arranged between each pair of filter and NOx reducing catalyst. By doing this, the filter rectifies the flow of the exhaust gas EX, so that the detection accuracy of the pressure of the exhaust gas EX by the pressure sensor is improved. As a result, it is possible to obtain the flow rate of the exhaust gas EX flowing through each exhaust gas passage and the flow rate of NOx flowing through each exhaust gas passage with a higher degree of accuracy. In the embodiment, the NOx detection sensor 15 may be arranged on the upstream side of the NOx reducing catalyst in the flowing direction of the exhaust gas EX.

In the embodiment, the number of the exhaust gas passages and the NOx reducing catalysts is two each. However, the number of these is not limited to two, but may be three or more. When the number of the exhaust gas passages and the NOx reducing catalysts is three or more, the flow rate $Q_{mi}$ of the exhaust gas EX flowing through each NOx reducing catalyst is represented by Formula (14) and Formula (15). Here, i is a suffix to identify a plurality of exhaust gas passages and NOx reducing catalysts and is an integer greater than or equal to 1. $P_{ui}$ is the pressure of the exhaust gas EX on the upstream side of the NOx reducing catalyst, $P_{di}$ is the pressure of the exhaust gas EX on the downstream side of the NOx reducing catalyst, and $T_i$ is the temperature of the exhaust gas EX on the upstream side of the NOx reducing catalyst. $D1_i$ and $D2_i$ are constants.

$$Q_{mi} = k \times \sqrt{\frac{P_{ui} \times (P_{ui} - P_{di})}{T_i}} \quad (14)$$

$$Q_{mi} = D1_i \times \sqrt{\frac{P_{ui} \times (P_{ui} - P_{di})}{T_i}} + D2_i \quad (15)$$

Formula (14) is a formula in which a relationship between the flow rate $Q_{mi}$ and the pressure parameter is a linear function passing through the origin as illustrated by the straight line La illustrated in FIG. 3. Formula (14) corresponds to Formula (1) and Formula (2) described above. Formula (15) is a formula in which a relationship between the flow rate $Q_{mi}$ and the pressure parameter is a linear function that does not pass through the origin as illustrated by the straight line Lb illustrated in FIG. 3. Formula (15) corresponds to Formula (3) and Formula (4) described above. A flow rate ratio $\epsilon_i$ between a plurality of NOx reducing catalysts is represented by Formula (16). Here, j in Formula (16) is a total number of NOx reducing catalysts included in the exhaust gas processing device 20 and is an integer greater than or equal to 2. At this time, the aforementioned suffix i varies from 1 to j.

$$\varepsilon_i = \frac{Q_{mi}}{\sum_{i=1}^{j} Q_{mi}} \quad (16)$$

The flow rate $Q_{mi}'$ of the exhaust gas EX flowing through each NOx reducing catalyst is represented by $Q_{mi}' = \epsilon_i \times Q_m$ by using the flow rate ratio $\epsilon_i$ obtained from Formula (16) and the total flow rate $Q_m$ of the exhaust gas EX. When the flow rate $Q_{mi}'$ of the exhaust gas EX flowing through each NOx reducing catalyst is obtained, it is possible to obtain the flow rate of NOx flowing through each NOx reducing catalyst from the concentration of NOx contained in the exhaust gas EX. When the flow rate of NOx flowing through each NOx reducing catalyst is obtained, it is possible to obtain the amount of reducing agent R required for each NOx reducing catalyst.

In the embodiment, the reducing agent R is not limited to urea, but may be, for example, hydrocarbon such as light oil, ethanol, isopropyl alcohol, and dimethyl ether. When light oil is used as the reducing agent R, the fuel of the diesel engine 10 can be used, so that it is not necessary to separately provide a tank of the reducing agent R. As a result, it is possible to simplify the structure of the exhaust gas processing device 20. In the embodiment, the NOx reducing catalyst only has to reduce NOx by the reducing agent R, so that the NOx reducing catalyst is not limited to a selective catalyst.

In the embodiment, an example is described in which the diesel engine 10 exhausts the exhaust gas EX to one exhaust pipe 21, the exhaust gas EX is branched into a plurality of exhaust gas passages, and the exhaust gas EX is processed by the NOx reducing catalyst provided in each exhaust gas passage. However, the embodiment is not limited to the example in which the exhaust gas of the diesel engine 10, which is exhausted to one exhaust pipe 21, is branched. For example, the embodiment can also be applied to a diesel engine, which has a plurality of cylinder banks in which a plurality of cylinders are arranged in-line, that is, so-called V-type cylinder arrangement and a horizontally opposed cylinder arrangement, and which has an exhaust gas passage and a NOx reducing catalyst for each cylinder bank. In this case, as the fuel injection amount $M_{F1}$ used when obtaining the total flow rate $Q_m$ of the exhaust gas EX, a total sum of fuel injection amounts of each cylinder bank may be used. As described above, the flow rate of the exhaust gas EX flowing through each exhaust gas passage is obtained based on the pressure in each exhaust gas passage. In this way, the embodiment can be applied to a diesel engine which has a plurality of exhaust gas passages, through which the exhaust gas EX passes, and in which a NOx reducing catalyst is provided to each exhaust gas passage.

The embodiment is not limited by the above description. The components of the embodiment described above include components which those skilled in the art can easily perceive, substantially identical components, and components within an equivalent range. Further, the aforementioned components can be arbitrarily combined. The components can be removed, replaced, and modified in various manners without departing from the scope of the embodiment. The diesel engine according to the embodiment, and devices and apparatuses to which the control method of the diesel engine is applied, are not particularly limited.

REFERENCE SIGNS LIST

10 DIESEL ENGINE
10C CYLINDER
11 FUEL INJECTION DEVICE
11I INJECTOR
11R ACCUMULATOR
12 INTAKE PIPE
13 AIR CLEANER
14 INTAKE AIR AMOUNT SENSOR
15 NOx DETECTION SENSOR
20, 20a EXHAUST GAS PROCESSING DEVICE
21 EXHAUST PIPE
21S BRANCH PORTION
22A FIRST BRANCH PIPE
22B SECOND BRANCH PIPE
23A FIRST DPF
23B SECOND DPF
25A FIRST CATALYST
25B SECOND CATALYST
27A FIRST PRESSURE SENSOR
27B SECOND PRESSURE SENSOR
28A FIRST TEMPERATURE SENSOR
28B SECOND TEMPERATURE SENSOR

29A THIRD PRESSURE SENSOR
29B FOURTH PRESSURE SENSOR
30 REDUCING AGENT SUPPLY DEVICE
50 CONTROL DEVICE
51 PROCESSING UNIT
52 STORAGE UNIT
R REDUCING AGENT
$\alpha, \epsilon_i$ FLOW RATE RATIO

The invention claimed is:

1. An exhaust gas processing device comprising:
a plurality of exhaust gas passages, wherein exhaust gas exhausted from a diesel engine is divided to pass through the exhaust gas passages;
a reducing catalyst which is provided in each of the exhaust gas passages and reduces NOx in the exhaust gas by a reducing agent;
a NOx detection sensor which is arranged on an upstream side of the catalyst in an exhaust gas flowing direction and which detects a concentration of NOx contained in the exhaust gas exhausted from the diesel engine;
a pressure sensor which is arranged on an upstream side of each of the reducing catalysts in the exhaust gas flowing direction and which detects a pressure in each of the exhaust gas passages; and
a control device that obtains a flow rate of the exhaust gas flowing through each of the exhaust gas passages based on at least a detection value of each of the pressure sensors, obtains a flow rate of NOx in each of the exhaust gas passages from the obtained flow rate of the exhaust gas in each of the exhaust gas passages and the concentration of NOx detected by the NOx detection sensor which is arranged on the upstream side of the catalyst in the exhaust gas flowing direction, and obtains an amount of reducing agent to be supplied to each of the reducing catalysts from the obtained flow rate of NOx in each of the exhaust gas passages.

2. The exhaust gas processing device according to claim 1, further comprising:
an exhaust gas total flow rate detection unit that obtains a total flow rate of the exhaust gas exhausted from the diesel engine,
wherein the control device obtains a flow rate ratio of the exhaust gas flowing through the exhaust gas passages based on the detection value of each of the pressure sensors, and obtains the flow rate of the exhaust gas flowing through each of the exhaust gas passages based on the obtained flow rate ratio and the total flow rate of the exhaust gas.

3. The exhaust gas processing device according to claim 2, wherein the exhaust gas total flow rate detection unit obtains the total flow rate of the exhaust gas from an intake air amount of the diesel engine and a fuel injection amount to the diesel engine.

4. The exhaust gas processing device according to claim 1, further comprising:
a temperature sensor that detects a temperature of the exhaust gas flowing through each of the exhaust gas passages,
wherein the control device obtains the flow rate of the exhaust gas flowing through the exhaust gas passage by further using the temperature of the exhaust gas detected by the temperature sensor.

5. The exhaust gas processing device according to claim 1, wherein
a filter is provided on the upstream side of each of the reducing catalysts in the exhaust gas flowing direction, and
each of the pressure sensors is arranged between each pair of the filter and the reducing catalyst.

6. A diesel engine comprising the exhaust gas processing device according to claim 1.

7. An exhaust gas processing method in which exhaust gas exhausted from a diesel engine is divided to pass through a plurality of exhaust gas passages to be guided to a plurality of reducing catalysts that reduce NOx in the exhaust gas by a reducing agent and the reducing catalysts, the exhaust gas processing method comprising:
detecting a concentration of NOx contained in the exhaust gas exhausted from the diesel engine on an upstream side of the reducing catalysts in an exhaust gas flowing direction;
obtaining a flow rate of the exhaust gas flowing through each of the exhaust gas passages based on at least a pressure in each of the exhaust gas passages on an upstream side of each of the reducing catalysts in an exhaust gas flowing direction;
obtaining a flow rate of NOx in each of the exhaust gas passages from the obtained flow rate of the exhaust gas in each of the exhaust gas passages and a concentration of the NOx contained in the exhaust gas on the upstream side of each of the reducing catalysts in the exhaust gas flowing direction; and
obtaining an amount of reducing agent to be given to each of the reducing catalysts from the obtained flow rate of NOx in each of the exhaust gas passages.

8. The exhaust gas processing method according to claim 7, wherein the obtaining the flow rate of the exhaust gas flowing through each of the exhaust gas passages includes obtaining a flow rate ratio of the exhaust gas flowing through each of the exhaust gas passages based on a pressure in each of the exhaust gas passages and obtaining the flow rate of the exhaust gas flowing through each of the exhaust gas passages based on the obtained flow rate ratio and a total flow rate of the exhaust gas.

9. The exhaust gas processing method according to claim 8, wherein the total flow rate of the exhaust gas is obtained from an intake air amount of the diesel engine and a fuel injection amount to the diesel engine.

10. The exhaust gas processing method according to claim 7, wherein
obtaining the flow rate of the exhaust gas flowing through each of the exhaust gas passages includes obtaining the flow rate of the exhaust gas flowing through the exhaust gas passage by further using a temperature of the exhaust gas flowing through each of the exhaust gas passages.

11. The exhaust gas processing device according to claim 2, wherein the exhaust gas total flow rate detection unit obtains the total flow rate of the exhaust gas from at least an intake air amount of the diesel engine.

* * * * *